US012668914B2

(12) United States Patent     (10) Patent No.:   US 12,668,914 B2

Cheon et al.                  (45) Date of Patent:      Jun. 30, 2026

(54) LAUNDRY TREATING APPARATUS AND METHOD FOR CONTROLLING THE LAUNDRY TREATING APPARATUS

(71) Applicant: LG Electronics Inc., Seoul (KR)

(72) Inventors: Taewon Cheon, Seoul (KR); Jaehwan Kwon, Seoul (KR); Byeongjo Ryoo, Seoul (KR)

(73) Assignee: LG Electronics Inc., Seoul (KR)

( * ) Notice: Subject to any disclaimer, the term of this patent is extended or adjusted under 35 U.S.C. 154(b) by 998 days.

(21) Appl. No.: 17/776,084

(22) PCT Filed: Dec. 16, 2020

(86) PCT No.: PCT/KR2020/018401

§ 371 (c)(1),
(2) Date: May 11, 2022

(87) PCT Pub. No.: WO2021/125768

PCT Pub. Date: Jun. 24, 2021

(65) Prior Publication Data

US 2022/0389645 A1     Dec. 8, 2022

(30) Foreign Application Priority Data

Dec. 17, 2019    (KR) ........................ 10-2019-0169252

(51) Int. Cl.
*D06F 58/45*        (2020.01)
*B01D 46/00*        (2022.01)
              (Continued)

(52) U.S. Cl.
CPC ......... *D06F 58/45* (2020.02); *B01D 46/0086* (2013.01); *B01D 46/446* (2013.01); (Continued)

(58) Field of Classification Search
CPC ........ D06F 58/206; D06F 58/24; D06F 58/45; D06F 58/203; D06F 58/22; D06F 58/38; (Continued)

(56) References Cited

U.S. PATENT DOCUMENTS

2012/0006006 A1*   1/2012   Hertzberg ............... F01N 3/022
                                        60/311
2013/0091726 A1     4/2013   Kim et al.
                (Continued)

FOREIGN PATENT DOCUMENTS

CN       101792967       8/2010
CN       105506939       4/2016
                (Continued)

OTHER PUBLICATIONS

Extended European Search Report in European Appln. No. 20901641.9, mailed on Dec. 19, 2023, 6 pages.

(Continued)

*Primary Examiner* — Jessica Yuen
(74) *Attorney, Agent, or Firm* — Fish & Richardson P.C.

(57) ABSTRACT

Disclosed is a method for controlling a laundry treating apparatus, wherein the laundry treating apparatus includes: a drum having a laundry storage space defined therein; a duct defining a channel for supplying air discharged from the drum back to the drum; a fan to move air along the duct; a heat-absorber for removing moisture from air introduced into the duct; a heat-emitter disposed inside the duct to heat air passing through the heat-absorber; a water collector for storing therein water discharged from air passing through the heat-absorber; a first filter for filtering air flowing from the drum to the duct; a second filter positioned between the first filter and the heat-absorber and filtering air passing through the first filter; a water discharger having a water storage space defined therein; a water discharger supply pipe (Continued)

for supplying water stored in the water collector to the water discharger; a water ejector for ejecting water into at least one of the second filter or the heat-absorber; a water ejector supply pipe for supplying water stored in the water collector to the water ejector; a water supply pipe constructed to connect the water discharger and the water collector to each other; a water supply valve for controlling opening and closing of the water supply pipe.

11 Claims, 5 Drawing Sheets

(51) Int. Cl.

| | |
|---|---|
| *B01D 46/44* | (2006.01) |
| *B01D 46/682* | (2022.01) |
| *D06F 58/20* | (2006.01) |
| *D06F 58/22* | (2006.01) |
| *D06F 58/38* | (2020.01) |
| *D06F 103/18* | (2020.01) |
| *D06F 103/30* | (2020.01) |
| *D06F 105/34* | (2020.01) |

(52) U.S. Cl.
CPC ......... *B01D 46/682* (2022.01); *D06F 58/203* (2013.01); *D06F 58/22* (2013.01); *D06F 58/38* (2020.02); *D06F 2103/18* (2020.02); *D06F 2103/30* (2020.02); *D06F 2105/34* (2020.02)

(58) Field of Classification Search
CPC ............. D06F 2103/18; D06F 2103/30; D06F 2105/34; D06F 25/00; D06F 39/10; D06F 33/30; D06F 58/263; D06F 58/30; B01D 46/0086; B01D 46/446; B01D 46/682; B01D 46/681
See application file for complete search history.

(56) References Cited

U.S. PATENT DOCUMENTS

| | | | |
|---|---|---|---|
| 2018/0044844 A1 | 2/2018 | Bocchino et al. | |
| 2018/0171537 A1* | 6/2018 | Lee ........................... | B08B 3/14 |
| 2018/0245272 A1 | 8/2018 | Bocchino et al. | |
| 2019/0330790 A1 | 10/2019 | Ko et al. | |

FOREIGN PATENT DOCUMENTS

| | | | | |
|---|---|---|---|---|
| DE | 4304372 | | 8/1994 | |
| DE | 102008055086 | | 6/2010 | |
| EP | 2581490 | | 4/2013 | |
| EP | 2695986 | A2 | 2/2014 | |
| EP | 2691567 | B1 * | 11/2016 | ............ D06F 58/22 |
| KR | 20120017607 | | 2/2012 | |
| KR | 10-2013-0039811 | A | 4/2013 | |
| KR | 20190128484 | | 11/2019 | |
| WO | WO 2015010731 | | 1/2015 | |
| WO | WO 2018106035 | | 6/2018 | |
| WO | WO 2019145041 | | 8/2019 | |

OTHER PUBLICATIONS

Notice of Allowance in Korean Appln. No. 10-2019-0169252, mailed on May 25, 2025, 3 pages (with English translation).
Office Action in Chinese Appln. No. 202080088322.X, dated Mar. 16, 2023, 14 pages (with English translation).
International Search Report in International Appln. No. PCT/KR2020/018401, dated Apr. 16, 2021, 10 pages.

* cited by examiner

[Fig. 1]
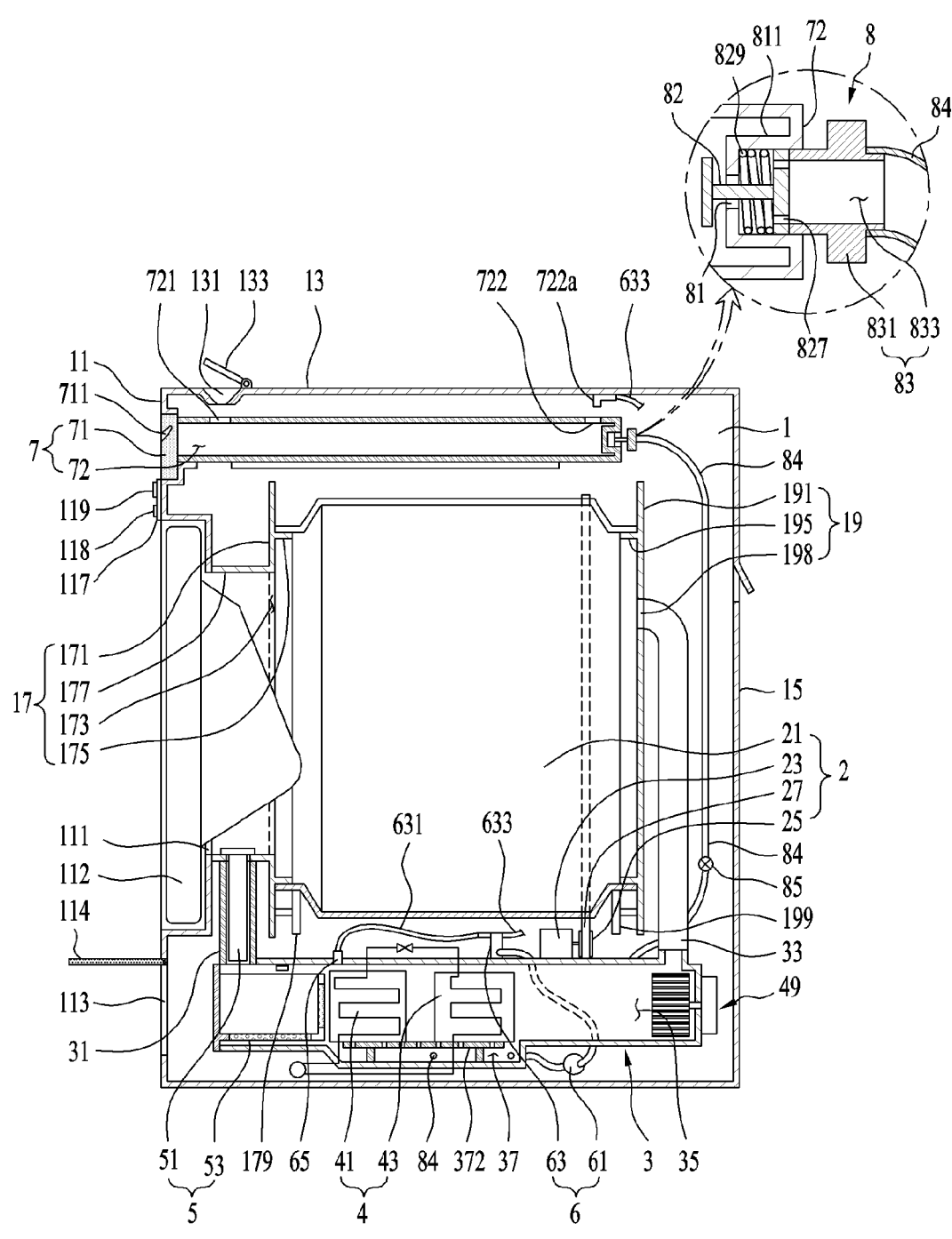

[Fig. 2]
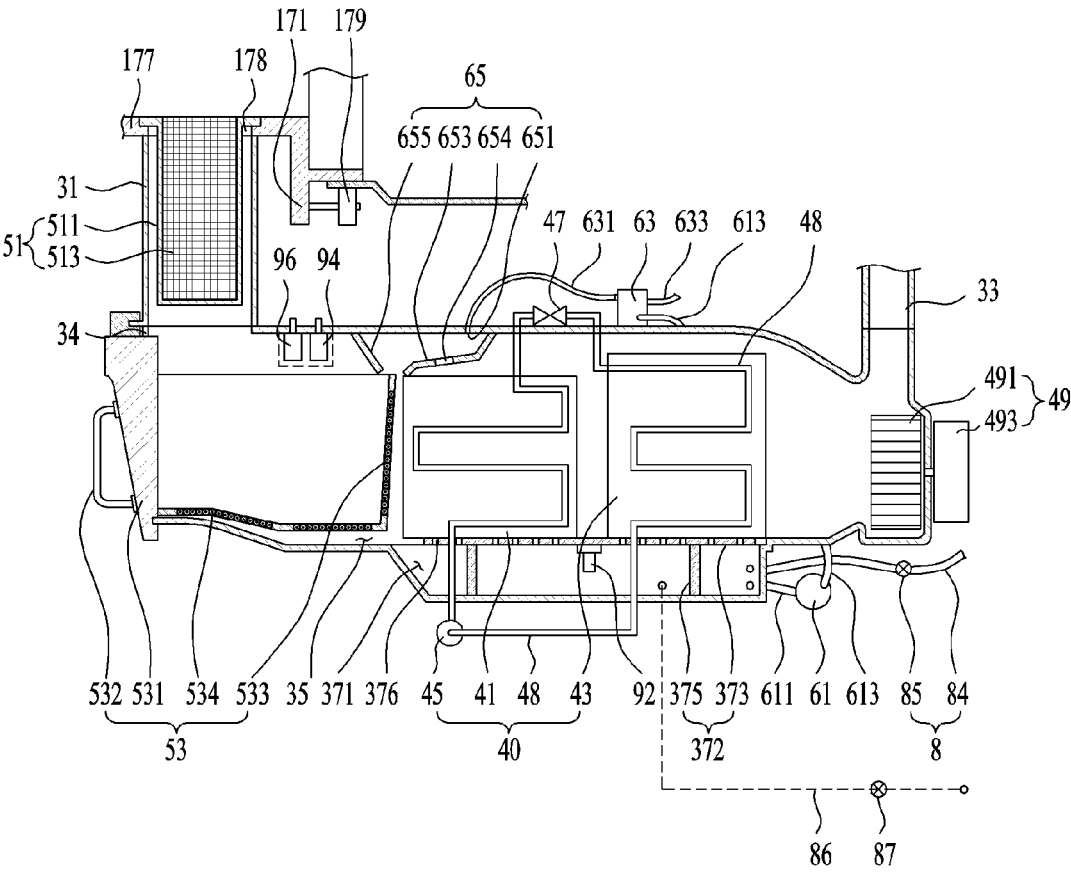
[Fig. 3]
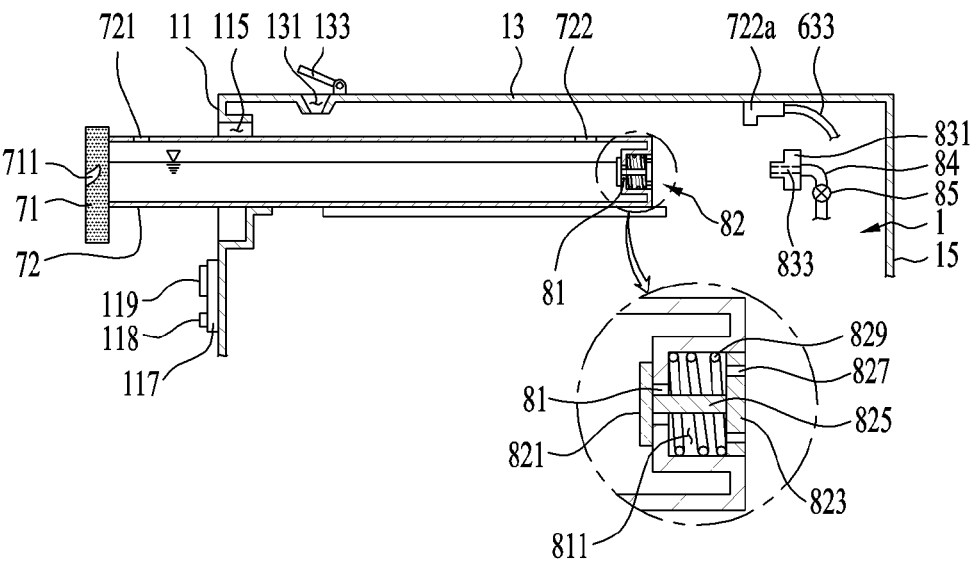

LAUNDRY TREATING APPARATUS AND METHOD FOR CONTROLLING THE LAUNDRY TREATING APPARATUS

CROSS-REFERENCE TO RELATED APPLICATIONS

This application is a National Stage application under 35 U.S.C. § 371 of International Application No. PCT/KR2020/018401, filed on Dec. 16, 2020, which claims the benefit of Korean Application No. 10-2019-0169252, filed on Dec. 17, 2019. The disclosures of the prior applications are incorporated by reference in their entirety.

TECHNICAL FIELD

The present disclosure relates to a laundry treating apparatus and a method for controlling the laundry treating apparatus.

BACKGROUND ART

A laundry treating apparatus refers to a generic term of an apparatus for washing laundry, an apparatus for drying laundry, and an apparatus capable of washing and drying laundry.

A conventional laundry treating apparatuses capable of drying laundry may include a drum that provides a space for storing laundry, a duct that defines a channel that resupplies air discharged from the drum to the drum, a first heat exchanger that cools air introduced into the duct from the drum to remove moisture included in the air, a second heat exchanger that heats air that has passed through the first heat exchanger, and a fan that moves air passing through the second heat exchanger to the drum.

In the conventional laundry treating apparatus having the above structure, the air discharged from the drum is dehumidified and heated while passing through the heat exchangers, and then is resupplied to the drum. Thus, contaminants such as lint remain in the heat exchangers. To solve such a problem, a conventional laundry treating apparatus includes a first filter that filters air flowing from the drum to the duct, and a second filter located between the first filter and the first heat exchanger to filter the air passing through the first filter (EP2691567B1). However, the laundry treating apparatus having the above-described structure has a disadvantage in that the apparatus may not determine which filter of the first filter and the second filter requires cleaning thereof.

DISCLOSURE OF INVENTION

Technical Problem

A purpose of the present disclosure is to provide a laundry treating apparatus and a method for controlling the laundry treating apparatus, wherein the apparatus may determine which of a first filter that filters air flowing from the drum to the duct, and a second filter located between the first filter and a heat exchanger to filter air passing through the first filter is in need of cleaning thereof.

Further, a purpose of the present disclosure is to provide a laundry treating apparatus and a method for controlling the laundry treating apparatus, wherein when a first filter is blocked, the apparatus asks a user to clean the first filter, and when the second filter is clogged, the laundry treating apparatus cleans the second filter by itself.

Further, a purpose of the present disclosure is to provide a laundry treating apparatus and a method for controlling the laundry treating apparatus, wherein the laundry treating apparatus is capable of determining a situation in which both the first filter and the second filter are blocked.

Solution to Problem

The present disclosure provides a method for controlling a laundry treating apparatus including: a pressure measurement operation in which a pressure between a first filter and a second filter is measured while a fan is working, wherein a first filter filters air flowing into a circulation channel that resupplies air discharged from a drum to the drum and the second filter filters air supplied to a first heat exchanger that cools the air; a cleaning request operation in which when a pressure between the first and second filters as measured by the pressure sensor is lower than a predefined reference pressure, a message requesting cleaning of the first filter is output via at least one of a display panel or a speaker; and a cleaning operation in which when the pressure between the first and second filters as measured by the pressure sensor is greater than or equal to the reference pressure, a water ejector ejects the water to at least one of the second filter or a first heat exchanger.

Further, the present disclosure provides a method for controlling a laundry treating apparatus including: an atmospheric pressure measurement operation in which a pressure between a first filter that filters air flowing into a circulation channel that resupplies air discharged from a drum to the drum and a second filter that filters air supplied to a first heat exchanger that cools the air; a pressure measurement operation in which a pressure between the first filter and the second filter is measured while a fan is operating; a cleaning request operation in which when a difference between the pressure measured in the pressure measurement operation and the pressure measured in the atmospheric pressure measurement operation is smaller than a difference between a predefined reference pressure and the pressure measured in the atmospheric pressure measurement operation, a message requesting cleaning of the first filter is output via at least one of a display panel or a speaker; and a cleaning operation in which when the difference between the pressure measured in the pressure measurement operation and the pressure measured in the atmospheric pressure measurement operation is greater than or equal to the difference between the predefined reference pressure and the pressure measured in the atmospheric pressure measurement operation, a water ejector ejects water to at least one of the second filter or the first heat exchanger.

The present disclosure provides a method for controlling a laundry treating apparatus, wherein the laundry treating apparatus includes: a drum having a laundry storage space defined therein; a duct defining a channel for supplying air discharged from the drum back to the drum; a fan to move air along the duct; a heat-absorber for removing moisture from air introduced into the duct; a heat-emitter disposed inside the duct to heat air passing through the heat-absorber; a water collector for storing therein water discharged from air passing through the heat-absorber; a first filter for filtering air flowing from the drum to the duct; a second filter positioned between the first filter and the heat-absorber and filtering air passing through the first filter; a water discharger having a water storage space defined therein; a water discharger supply pipe for supplying water stored in the water collector to the water discharger; a water ejector for ejecting water into at least one of the second filter or the heat-absorber; a water ejector supply pipe for supplying water stored in the water collector to the water ejector; a water supply pipe constructed to connect the water discharger and the water collector to each other; a water supply valve for controlling opening and closing of the water supply pipe, wherein the method includes: a pressure measurement operation in which a pressure sensor located between the first filter and the second filter measures a pressure inside the duct while the fan is working; a cleaning request operation in which when the pressure measured by the pressure sensor is lower than a predefined reference pressure, a message requesting cleaning of the first filter is output via at least one of a display panel or a speaker; and a cleaning operation in which when the pressure measured by the pressure sensor is greater than or equal to the reference pressure, the water ejector ejects the water to at least one of the second filter or the heat-absorber.

In one implementation, the method further includes a water-level measurement operation in which a water-level sensor measures a water-level of the water collector, wherein the cleaning operation is initiated when the water-level of the water collector is higher than or equal to a predefined cleaning-related reference water-level.

In one implementation, the method further includes a water supply request operation in which when the water-level of the water collector is lower than the cleaning-related reference water-level, water supply to the water discharger is requested via at least one of the display panel or the speaker.

In one implementation, the method further includes a water supply operation in which during the water supply request operation or after completion of the water supply request operation, a water supply valve controls a water supply pipe connecting the water discharger and the water collector to each other such that water inside the water discharger flows to the water collector.

In one implementation, the method further includes a water supply operation in which when the water-level of the water collector is lower than the cleaning-related reference water-level, a connection channel valve controls opening and closing of a connection channel connecting a water supply source located outside the laundry treating apparatus and the water collector to each other such that water is supplied to the water collector through the connection channel.

In one implementation, the method further includes a humidity measurement operation in which a humidity sensor located between the first filter and the second filter measures a humidity of air introduced into the duct while the fan is working, wherein the cleaning request operation is initiated when the pressure measured by the pressure sensor is lower than the reference pressure, and the humidity measured by the humidity sensor is lower than a predefined reference humidity.

In one implementation, the method further includes a drying operation in which when the pressure measured by the pressure sensor is lower than the reference pressure, and the humidity measured by the humidity sensor is greater than or equal to the reference humidity, the fan, the heat-absorber, and the heat-emitter work to perform heat exchange between air and laundry in the drum.

In one implementation, the method further includes: an atmospheric pressure measurement operation in which the pressure sensor measures a pressure inside the duct when an operation of the fan stops; and a notification operation in which when the pressure measured in the pressure measurement operation is equal to the pressure measured in the atmospheric pressure measurement operation, a message that the first filter and the second filter are blocked is notified to a user via at least one of the display panel or the speaker.

In one implementation, the method further includes an atmospheric pressure measurement operation in which the pressure sensor measures a pressure inside the duct when an operation of the fan stops, wherein the cleaning operation is initiated when the pressure measured in the pressure measurement operation is different from the pressure measured in the atmospheric pressure measurement operation, and a difference between the pressure measured in the pressure measurement operation and the pressure measured in the atmospheric pressure measurement operation is equal to or greater than a difference between the reference pressure and the pressure measured in the atmospheric pressure measurement operation.

In one implementation, the method further includes a humidity measurement operation in which a humidity sensor located between the first filter and the second filter measures a humidity of air introduced into the duct while the fan is working, wherein the cleaning request operation is initiated when the pressure measured in the pressure measurement operation is different from the pressure measured in the atmospheric pressure measurement operation, a difference between the pressure measured in the pressure measurement operation and the pressure measured in the atmospheric pressure measurement operation is smaller than a difference between the reference pressure and the pressure measured in the atmospheric pressure measurement operation, and the humidity measured by the humidity sensor is lower than a predefined reference humidity.

In one implementation, the method further includes a drying operation in which when the pressure measured in the pressure measurement operation is different from the pressure measured in the atmospheric pressure measurement operation, a difference between the pressure measured in the pressure measurement operation and the pressure measured in the atmospheric pressure measurement operation is smaller than a difference between the reference pressure and the pressure measured in the atmospheric pressure measurement operation, and the humidity measured by the humidity sensor is greater than or equal to the reference humidity, the fan, the heat-absorber, and the heat-emitter work to perform heat exchange between air and laundry in the drum.

Advantageous Effects of Invention

The present disclosure may realize the laundry treating apparatus and the method for controlling the laundry treating apparatus, wherein the apparatus may determine which of the first filter that filters air flowing from the drum to the duct, and the second filter located between the first filter and the heat exchanger to filter air passing through the first filter is in need of cleaning thereof.

Further, the present disclosure may realize the laundry treating apparatus and the method for controlling the laundry treating apparatus, wherein when the first filter is blocked, the apparatus asks the user to clean the first filter, and when the second filter is clogged, the laundry treating apparatus cleans the second filter by itself.

Further, the present disclosure may realize the laundry treating apparatus and the method for controlling the laundry treating apparatus, wherein the laundry treating apparatus is capable of determining a situation in which both the first filter and the second filter are blocked.

BRIEF DESCRIPTION OF DRAWINGS

FIG. 1 shows an example of a laundry treating apparatus.

FIG. 2 shows an example of a heat exchanger and cleaner disposed in a laundry treating apparatus.

FIG. 3 shows an example of a water discharger and a water supplier disposed in a laundry treating apparatus.

BEST MODE FOR CARRYING OUT THE INVENTION

Figure 4:
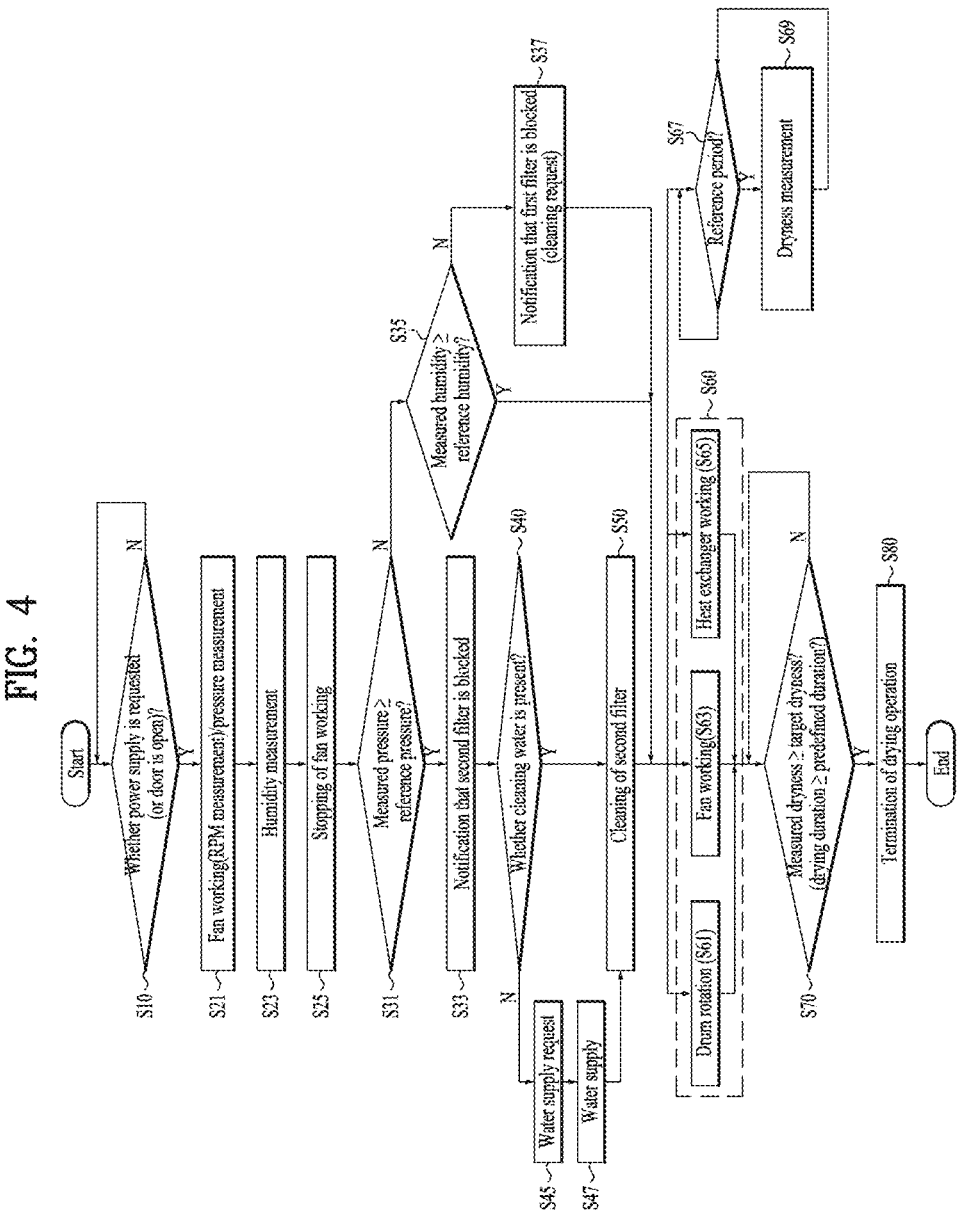
FIG. 4, FIG. 5, and FIG. 6 show embodiments of a method for controlling a laundry treating apparatus.

Hereinafter, preferred embodiments of a laundry treating apparatus and a control method thereof may be described in detail with reference to the accompanying drawings. A configuration or a control method of an apparatus to be described below are intended only for describing examples of an laundry treating apparatus and a control method thereof, and is not intended to limit a scope of the disclosure. The same reference numerals throughout the specification represent the same elements.

FIG. 1 shows one example of a laundry treating apparatus 100. The laundry treating apparatus 100 may include a cabinet 1, a drum rotatably received in the cabinet and having a laundry storage space therein, a duct 3 that defines a channel for resupplying air discharged from the drum 2 to the drum 2, and a heat exchanger 4 that dehumidifies and heats air introduced into the duct 3 and then resupplies the same to the drum 2.

The cabinet 1 may be configured to include a front panel 11 defining a front face of the laundry treating apparatus, a rear panel 15 defining a rear face of the laundry treating apparatus, and a top panel 13 defining a top face of the laundry treating apparatus.

The front panel 11 has a cabinet laundry inlet 111 defined therein and constructed to communicate with the drum 2. The cabinet laundry inlet 111 may be constructed to be opened and closed by a door 112 pivotably coupled to the cabinet.

A control panel 117 may be disposed on the front panel 11. The control panel 117 may include an input interface 118 for receiving a control command from a user and a display 119 for outputting information such as a control command selectable by the user.

The input interface 118 may include a power supply request unit that requests power supply to the laundry treating apparatus, a course input interface that enables a user to select a desired course from among a plurality of courses, and an execution request unit that requests initiation of a course selected by the user. The display 119 may include at least one of a display panel capable of outputting texts and figures, and a speaker capable of outputting audio signals and sounds.

When the drum 2 is embodied as a cylindrical drum body 21 with open front and rear faces, the cabinet 1 may contain a first support 17 rotatably supporting a front face of the drum 2, and a second support 19 rotatably supporting a rear face of the drum 2.

The first support 17 may include a first fixed body 171 fixed disposed inside the cabinet 1, a drum laundry inlet 173 constructed to pass through the first fixed body and to communicate the cabinet laundry inlet 111 with an inside of the drum body 21, and a first support body 175 disposed on the first fixed body 171 and inserted into a front face (a first opening) of the drum body 21.

The first fixed body 171 may have any shape as long as the drum laundry inlet 173 is defined therein and the first support body 175 is disposed thereon. The first support body 175 may be embodied as a pipe shape protruding from the first fixed body 171 toward the drum body 21. A diameter of the first support body 175 may be larger than a diameter of the drum laundry inlet 173 and may be smaller than a diameter of the front face of the drum body 21. In this case, the drum laundry inlet 173 may be located inside a space defined by the first support body 175.

The first support 17 may be constructed to further include a connection body 177 connecting the cabinet laundry inlet 111 and the drum laundry inlet 173 with each other. The connection body 177 may be embodied as a pipe shape extending from the drum laundry inlet 173 toward the cabinet laundry inlet 111. The connection body 177 may have an air outlet 178 defined therein that communicates with the duct 3. As shown in FIG. 2, the air outlet 178 refers to a passage that allows air inside the drum body 21 to move to the duct 3 therethrough, and may be embodied as a through-hole constructed to pass through the connection body 177.

As shown in FIG. 1, the second support 19 may include a second fixed body 191 disposed fixedly inside the cabinet 1 and a second support body 195 disposed on the second fixed body 191 and inserted into a rear face (a second opening) of the drum body 21. The second support 19 may have an air inlet 198 defined therein to pass through the second fixed body 191 and communicate the inside of the drum body 21 with the inside of the cabinet 1. In this case, the duct 3 may be constructed to connect the air outlet 178 and the air inlet 198 to each other.

The cylindrical drum body 21 having an empty inner space defined therein may rotate via various types of drivers. FIG. 1 illustrates one example where the driver may be configured to include a motor 23 disposed fixedly inside the cabinet 1, a pulley 25 rotated by the motor, and a belt 27 connecting a circumferential surface of the pulley 25 and a circumferential surface of the drum body 21 with each other.

In this case, the first support 17 may include a first roller 179 rotatably supporting a circumferential surface of the drum body 21. The second support 19 may have a second roller 199 that rotatably supports a circumferential surface of the drum body.

The duct 3 may be configured to include a discharge duct 31 connected to the air outlet 178, a supply duct 33 connected to the air inlet 198, and a connection duct 35 connecting the discharge duct and the supply duct with each other.

The heat exchanger 4 may be embodied as a variety of devices capable of sequentially performing dehumidification and heating of the air introduced into the duct 3.

FIG. 2 illustrates one example where the heat exchanger is embodied as a heat pump.

The heat exchanger 4 shown in FIG. 2 may include a fan 49 that moves air along the duct 3, a first heat exchanger (heat-absorber) 41 that removes moisture from the air flowing into the duct 3, and a second heat exchanger (heat-emitter) 43 disposed inside the duct 3 to heat air passing through the first heat exchanger 41.

The fan 49 may be configured to include an impeller 491 disposed inside the duct 3 and an impeller motor 493 rotating the impeller 491. The impeller 491 may be disposed in any one of the discharge duct 31, the connection duct 35, and the supply duct 33. FIG. 2 illustrates one example where the impeller 491 is installed in the supply duct 33 (is located in rear of the heat-emitter).

The heat-absorber 41 may be embodied as a plurality of metal plates arranged along a Y-axis direction (in a width direction of the connection duct 35) or a Z-axis direction (in a height direction of the connection duct). The heat-emitter 43 may be embodied as a plurality of metal plates arranged along the width direction of the connection duct or the height direction of the connection duct. The heat-absorber 41 and the heat-emitter 43 may be sequentially arranged in the connection duct 35 in a direction from the discharge duct 31 to the supply duct 33, and may be connected to each other through a refrigerant pipe 48 that defines a circulation channel of refrigerant.

The refrigerant may flow along the refrigerant pipe 48 by a compressor 45 located outside the duct 3. A pressure adjuster 47 may be disposed at the refrigerant pipe 48 to control a pressure of the refrigerant that has passed through the heat-emitter 43.

The heat-absorber 41 may refer to means to cool the air and evaporate the refrigerant by transferring heat of the air flowing into the discharge duct 31 to the refrigerant. The heat-emitter 43 may refer to means for heating the air and condensing the refrigerant by transferring heat from the refrigerant that has passed through the compressor 45 to the air. In this case, moisture contained in the air may be collected on a bottom face of the connection duct 35 along a surface of the heat-absorber 41 as the air passes through the heat-absorber 41.

A water collector 37 may be disposed in the laundry treating apparatus 100 to collect water removed from the air passing through the heat-absorber 41. FIG. 2 shows an example where the water collector 37 is located inside the connection duct 35.

The water collector 371 and 372 in FIG. 2 may include a water collector body 371 that is fixed to a bottom face of the connection duct 35 and communicates with the inside of the connection duct. To prevent the heat-absorber 41 and the heat-emitter 43 from contacting water (condensate water) stored in the water collector body 371, a heat exchanger support 372 may be further disposed inside the water collector body 371. The heat exchanger support 372 may be configured to include a support plate 373 with which the heat-absorber 41 and the heat-emitter 43 are in contact, a pacer 375 to maintain a space between the support plate 373 and a bottom face of the water collector body 371, and a support plate through-hole 376 constructed to pass through the support plate 373.

The support plate through-hole 376 may be defined only in a portion of the support plate 373 on which the heat-absorber 41 is supported, or may be defined in a portion thereof on which the heat-absorber is supported and a portion thereof on which the heat-emitter is supported. When the support plate through-hole 376 is defined under the heat-emitter 43, water transferred to the heat-emitter 43 along the support plate 373 may be discharged to the water collector body 371 (thus, preventing decrease in heat transfer efficiency that may otherwise occur when the heat-emitter contacts the water).

In order to minimize accumulation of contaminants (lint) discharged from the drum body 21 on the heat-absorber 41 and the heat-emitter 43, a filter assembly for filtering air may be further disposed in the laundry treating apparatus 100. FIG. 2 illustrates one example where the filter assembly includes a first filter assembly 51 disposed in the discharge duct 31 and a second filter assembly 53 disposed in the connection duct 35.

The first filter assembly 51 may be embodied as means for filtering air flowing from the drum body 21 into the discharge duct 31. The second filter assembly 53 may be disposed between the first filter assembly 51 and the heat-absorber 41 and may be embodied as means for filtering air that has passed through the first filter assembly.

The first filter assembly 51 may include a first frame 511 detachably inserted into the discharge duct 31 through the air outlet 178, and a first filter 513 disposed in the first frame to filter air.

The second filter assembly 53 may be detachably disposed in the connection duct 35. In this case, a filter insertion hole 113 (refer to FIG. 1) through which the second filter assembly 53 is drawn out may be defined in the front panel 11 of the cabinet, and an insertion hole door 114 to open and close the filter insertion hole may be disposed thereon. The duct 3 may have a duct through-hole 34 (refer to FIG. 2) defined therein into which the second filter assembly 53 is inserted. Therefore, the user may separate the second filter assembly 53 from the laundry treating apparatus and remove the contaminants remaining in the second filter assembly 53 and clean the second filter assembly, when necessary.

As shown in FIG. 2, the second filter assembly 53 may include a second frame 531 inserted into the duct through-hole 34 and positioned between the first filter assembly 51 and the heat-absorber 41, and filters 533 and 534 that are disposed in the second frame and filter fluids (air and water) moving to the heat-absorber 41 and the water collector body 371.

The second frame 531 may be implemented in various forms depending on a shape of a cross-section (Y-Z plane and X-Z plane) of the connection duct 35. FIG. 2 shows an example where the second frame 531 has a shape similar to a hexahedron.

In this case, an air inlet may be defined in a top face of the second frame 531 to introduce air that has passed through the second filter assembly 51 into an inside of the second frame 531. A handle 532 protruding toward the filter insertion hole 113 may be disposed on a front face of the second frame 531. The filters 533 and 534 may include a second filter 533 disposed on a rear face of the second frame 531 and a third filter 534 disposed on a bottom face of the second frame 531. The rear face of the second frame refers to a face of the second frame 531 facing toward the heat-absorber 41. The bottom face of the second frame may refer to a face thereof facing toward a bottom face of the connection duct 35 and may be defined as a face facing toward the air inlet. A diameter of a filter hole defined in the first filter 513 may be set to be larger than a diameter of a filter hole defined in each of the second filter 533 and the third filter 534.

As shown in FIG. 1, the laundry treating apparatus 100 may further include a cleaner 6 which uses the water stored in the water collector body 371 to clean the second filter assembly 53, and a water discharger 7 which discharges the water inside the water collector body 371 to an outside of the water collector body 371.

As shown in FIG. 2, the cleaner 6 may be embodied as means for cleaning at least one of the second filter 533, the third filter 534, and the heat-absorber 41 by ejecting the water stored in the water collector body 371 into the second filter assembly 53. The cleaner 6 may be configured to include a water ejector 65 that is disposed at the duct 3 and supplies water to the second filter assembly 53, and a pump 61 that moves water stored in the water collector body 371 to the water ejector 65.

The pump 61 may be connected to the water collector body 371 through a first connection pipe 611, and may be connected to the water ejector 65 through a second connection pipe 613. When the laundry treating apparatus 100 is configured to move the water from the water collector body 371 to the water ejector 65 and the water discharger 7 using only a single pump 61, the laundry treating apparatus 100 may further include a channel switch 63. In this case, the channel switch 63 may be connected to the pump 61 through the second connection pipe 613. The water ejector 65 may be connected to the channel switch 63 through a water ejector supply pipe 631. The water discharger 7 may be constructed to be connected to the channel switch 63 through a water discharger supply pipe 633.

The channel switch 63 may include a valve that controls opening and closing of the water ejector supply pipe 631 and a valve that controls opening and closing of the water discharger supply pipe 633. Therefore, the laundry treating apparatus 100 may control the valves disposed in the channel switch 63 such that the water stored in the water collector body 371 may be supplied to the water ejector 65 or the water discharger 7.

The water ejector 65 may be embodied as nozzles which may be fixed to the connection duct 35 and ejects water to the second filter 533 and the third filter 534, respectively, or may be embodied as nozzles for ejecting water to the second filter 533, the third filter 534, and a front face of the heat-absorber 41, respectively.

FIG. 2 shows one example where the water ejector 65 includes a duct through-hole 651 passing through the connection duct 35, and connected to the water ejector supply pipe 631, a first guide 653 which guides water supplied from the duct through-hole to the second filter 533, and a second guide 655 constructed to guide at least a portion of the water supplied through the first guide 653 to a front face of the heat-absorber 41. In this case, the second guide 655 may be embodied as means for supplying water to the front face of the heat-absorber 41 through the second filter 533. That is, the second filter 533 may be positioned between the first guide 653 and the second guide 655 when the second filter assembly 53 is fixed to the connection duct 35. The second guide 655 may be embodied as an inclined face inclined downward from a top face of the connection duct 35 toward the second filter 533.

A guide through-hole 654 may be further defined in the first guide 653. The guide through-hole 654 may refer to a hole passing through the first guide 653. Thus, the water introduced into the duct through-hole 651 may be supplied to a front region of the heat-absorber 41 through the guide through-hole 654. The front region of the heat-absorber refers to a region thereof facing toward the second filter 533 in a vertical line passing through a center of the heat-absorber 41.

As shown in FIG. 3, the water discharger 7 may include a water storage body 72 that is detachably disposed on the cabinet 1 and had a space defined therein for storing water, and an inlet 722 constructed to pass through the water storage body 72 and to introduce water discharged from the water discharger supply pipe 633 into the water storage body 72.

The water storage body 72 may be embodied as a drawer-type tank which may extend or retract from or into the cabinet 1. In this case, a water discharger insertion hole 115 into which the water storage body 72 is inserted should be defined in the front panel 11 of the cabinet. A panel 71 may be fixed to a front face of the water storage body 72. The panel 71 may be constructed to be detachably coupled to the water discharger insertion hole 115 to define a portion of the front panel 11.

A groove 711 into which a user's hand is inserted may be further defined in the panel 71. In this case, the panel 71 may act as a handle to allow the user to pull the water storage body 72 out of the cabinet or insert the same into the cabinet.

The inlet 722 may be constructed to receive water discharged from the nozzle 722a fixed to the cabinet 1. A nozzle 722a may be fixed to the top panel 13 of the cabinet so that the nozzle is positioned above the inlet 722 when the water storage body 72 is inserted into the cabinet 1. In this case, the water discharger supply pipe 633 should be constructed to connect the nozzle 722a and the channel switch 63 with each other.

The water discharger 7 having the above structure may be configured such that the user pulls the water storage body 72 out of the cabinet 1 and then flips or tilts the water storage body 72 toward the inlet 722 such that the water inside the water storage body 72 may be discarded. A communication hole 721 may be constructed to pass through a top face of the water storage body 72 so that the water inside the water storage body 72 is easily discharged through the inlet 722.

The laundry treating apparatus 100 as described above has an effect of cleaning the second filter assembly 53 and the heat-absorber 41 using the water stored in the water collector body 371 during operation of the heat exchanger 4. However, when an amount of water stored in the water collector body 371 is small, cleaning of the second filter assembly 53 and the heat-absorber 41 may not be performed reliably. This is because of as follows: when an amount of laundry input to the drum body 21 is small, the amount of water collected in the water collector body 371 during the operation of the heat exchanger 4 may be small. When the amount of water stored in the water collector body is small, the water ejector 65 may not be able to supply enough water to clean the second filter assembly 53 and the heat-absorber 41.

To solve the above-described problem, the laundry treating apparatus 100 may further include a water supplier 8 that guides the water inside the water storage body 72 to the water collector body 371.

As shown in FIG. 3, the water supplier 8 may be configured to include a water discharge hole 81 constructed to discharge the water inside the water storage body 72 to the outside thereof, a water discharge valve 82 constructed to open and close the water discharge hole 81, a valve actuator 83 which opens the water discharge hole 81 by actuating the water discharge valve 82 when the water storage body 72 is fixed to the cabinet 1, a water supply pipe 84 which guides the water discharged from the water discharge hole 81 to the water collector body 371, and a water supply valve 85 that opens or closes the water supply pipe 84 according to a control signal of a controller (not shown).

The water storage body 71 may have a fastener 811 defined in a rear face thereof and embodied as a concave bent groove recessed toward the panel 71. The water discharge hole 81 may be embodied as a through-hole defined inside the fastener 811, constructed to pass through the water storage body 71.

The water discharge valve 82 may include a first valve body 821 which is located inside the water storage body 72 and closes the water discharge hole 81, a second valve body 823 located inside the fastener 811, a body connection bar 825 which is inserted into the water discharge hole 81 and connects the first valve body 821 and the second valve body 823 to each other, a valve body through-hole 827 constructed to pass through the second valve body 823, and a spring 829 disposed on the fastener 811 to generate a force that pushes the second valve body 823 in a direction away from the water discharge hole 81 (a direction in which a state in which the first valve body 821 closes the water discharge hole is kept).

The valve actuator 83 may be configured to include a fastening body 831 inserted into the fastener 811 to actuate the water discharge valve 82, and a body through-hole 833 constructed to pass through the fastening body. The fastening body 831 may have a shape that may be inserted into the fastener 811 when the water storage body 72 is inserted into the cabinet 1.

As shown in FIG. 1, the fastening body 831 pushes the second valve body 823 toward the water discharge hole 81 when the water storage body 72 is inserted into the cabinet 1. When the second valve body 823 moves toward the water discharge hole 81, the first valve body 821 opens the water discharge hole 81. Thus, water drained into the fastener 811 through the water discharge hole 81 may flow through the valve body through-hole 827 to the body through-hole 833. Since the body through-hole 833 is connected to the water collector body 371 through the water supply pipe 84, the laundry treating apparatus 100 may control the water supply valve 85 to supply water from the water storage body 72 to the water collector body 371.

Due to the above-described water supplier 8, the water discharger 7 may act as a water supply source (as disposed in laundry treating apparatus) that supplies water to the water collector 37 as well as means to allow the user to discharge the water collected in the water collector 37.

As shown in FIG. 2, the water supplier 8 may include a connection channel 86 connecting a water supply source located outside the cabinet and the water collector body 371, and a connection channel valve 87 to open or close the connection channel 86 based on a control signal of the controller.

As shown in FIGS. 1 and 2, the laundry treating apparatus 100 may be preferably configured to include a water collector water-level sensor 92 that measures a water-level of the water collector body 371 and transmits the same to the controller. When the water collector water-level sensor 92 is disposed, the laundry treating apparatus may determine a timing of moving the water stored in the water collector body 371 to the water storage body 72, and thus prevent the water from the water collector body 371 from flowing back to the connection duct 35.

The water collector water-level sensor 92 may be embodied as any device that may detect the water-level inside the water collector body 371. FIG. 1 shows an example of a sensor that determines the water-level by detecting a position of a floater that is installed on a bottom face of the water collector body 371 and moves up and down based on the water-level. FIG. 2 shows an example of a sensor embodied as a plurality of electrodes of different lengths (the number of the electrodes as electrically connected to each other may vary according to the water-level).

When the water-level measured via the water collector water-level sensor 92 is lower than a predefined cleaning-related reference water-level, the controller disposed in the laundry treating apparatus may control the water supply valve 85 to move the water from the water storage body 72 to the water collector body 371. Thus, the laundry treating apparatus 100 may be able to minimize a problem that the first filter assembly or the heat-absorber is not cleaned due to lack of the water in the water collector body 371.

To determine a dryness of laundry to determine an operation stop timing of the heat exchanger 4 based on the dryness, a dryness sensor may be disposed in the laundry treating apparatus 100. The dryness sensor may be embodied as at least one of an electrode sensor that may be constructed to contact the laundry and an amount of moisture contained in the laundry, and a humidity sensor that may measure humidity of air flowing from the drum 2 to the duct 3. have. FIG. 2 shows an example where the dryness sensor is embodied as a humidity sensor 96 that is located between the first filter 513 and the second filter 533 and measures the humidity of air introduced into the duct 3. As the dryness of laundry increases, the amount of moisture contained in the air flowing into duct 3 may decrease. The laundry treating apparatus 100 may observe the humidity of air introduced into the duct 3 using the humidity sensor 96 to determine the dryness of laundry.

Although not shown in the drawing, the electrode sensor may be configured to include a first electrode and a second electrode which are fixed to the first fixed body 171 and are capable of contacting the laundry inside the drum body 21. As the dryness increases, the amount of moisture contained in the laundry decreases, such that an electrical resistance of the laundry increases. Thus, the laundry treating apparatus 100 may observe the electrical resistance measured when the two electrodes are connected to each other via laundry to determine the dryness of the laundry.

Further, the laundry treating apparatus 100 may have a pressure sensor 94 positioned between the first filter 513 and the second filter 533 to measure a pressure inside the duct 3. The pressure sensor 94 and the humidity sensor 96 may be embodied as a single module and may be fixed to a top face of the connection duct 35.

Figure 5:
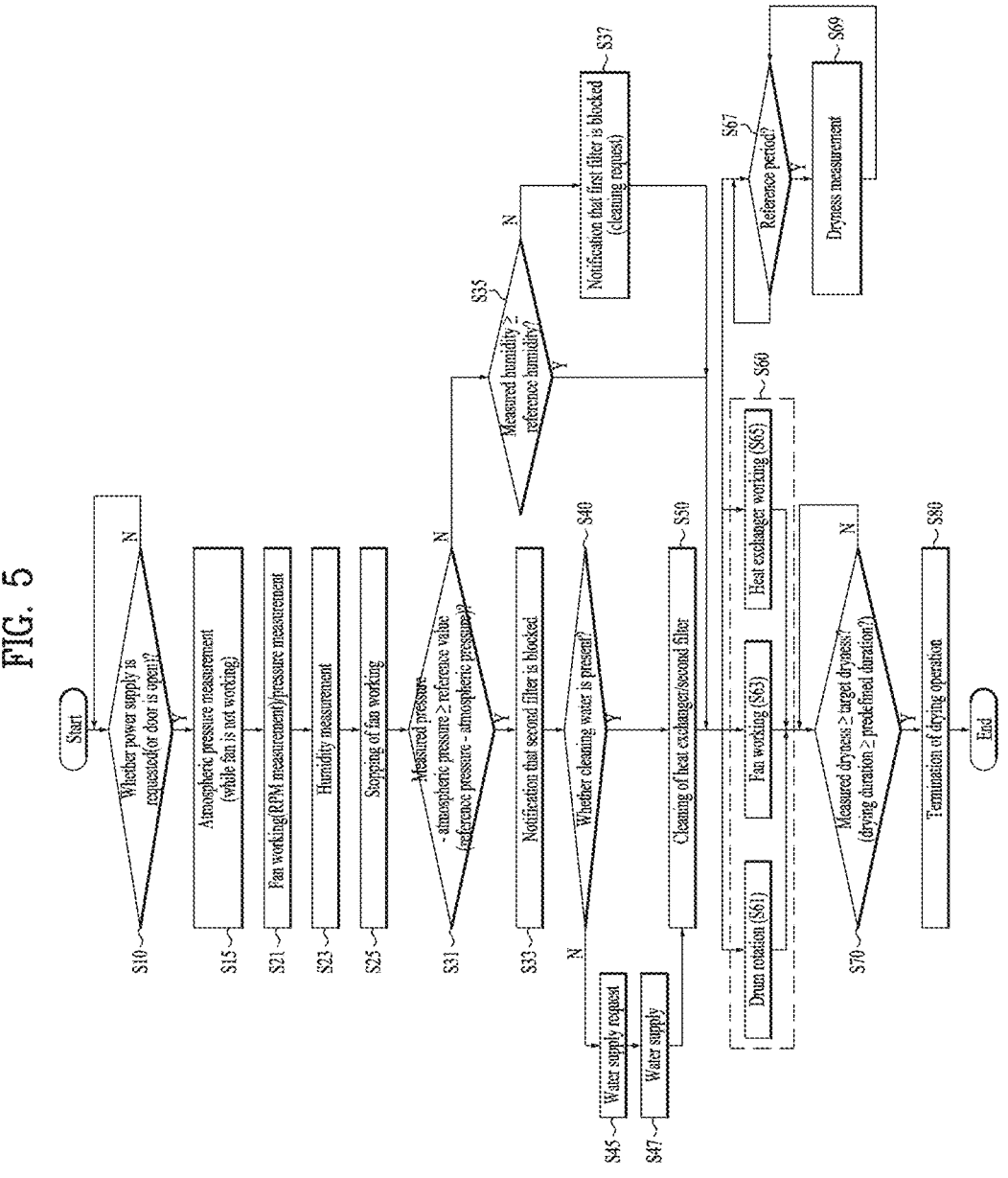
Figure 6:
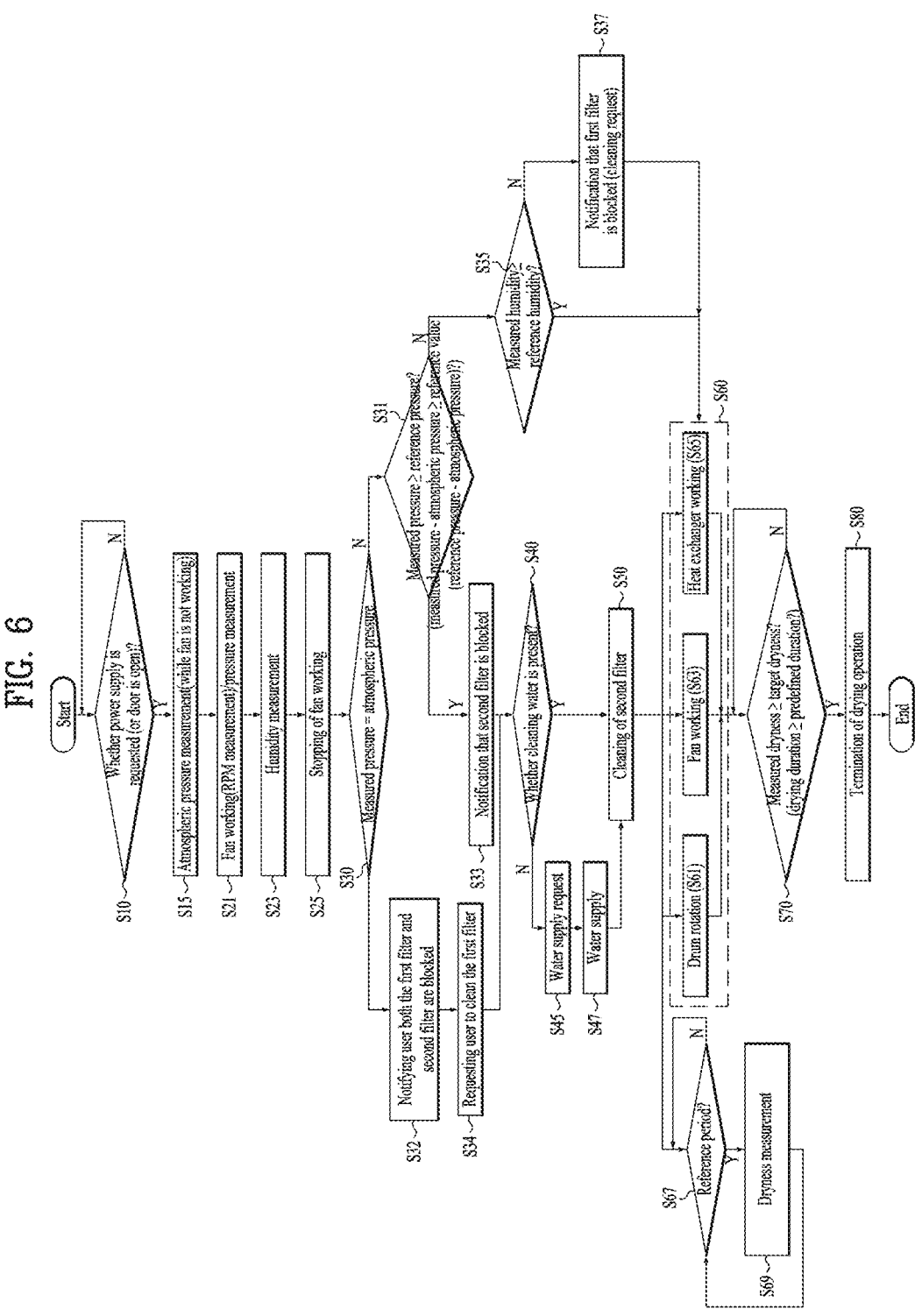

FIG. 4 to FIG. 6 shows examples of a method for controlling the laundry treating apparatus 100 having the above structure.

FIG. 4 shows a control method including a pressure measurement operation S21, where the pressure sensor 94 measures the pressure between the first filter 513 and the second filter 533 while the fan 49 is operating. The pressure measurement operation S21 may be initiated S10 when power supply to the laundry treating apparatus is requested via the input interface 118, or when the door 112 opens the laundry inlet 111.

After completion of the pressure measurement operation S21, the control method proceeds with operation S25 to terminate the operation of the fan. After the operation of the fan is terminated S25, the control method proceeds with a pressure comparison operation S31 of comparing the pressure measured in the pressure measurement operation S21 with a reference pressure.

When the pressure measured by the pressure sensor 94 is higher than a predefined reference pressure S31, the control method performs a cleaning operation S50 in which water is ejected to at least one of the second filter 533 and the heat-absorber 41 through the water ejector 65.

When less contaminants are accumulated on the first filter 513, while a lot of contaminants are accumulated on the second filter 533 or the heat-absorber 41, there may be a situation where an amount of air flowing through the first filter is greater than an amount of air exiting the second filter. Thus, the pressure between the first filter and the second filter may be higher than a normal state pressure.

On the contrary, when a lot of contaminants are accumulated on the first filter 513 while less contaminants are accumulated on the second filter 533 or the heat-absorber 41, the amount of air flowing through the first filter may be smaller than the amount of air exiting through the second filter. Thus, the pressure between the first filter and the second filter may be lower than the normal state pressure.

The normal state may refer to a state where there are no contaminants on the first filter and the second filter, or a state where an amount of contaminants which does not cause a drying duration to increase by 10% or greater remains on the first filter and the second filter. In this case, the reference pressure may be defined as a pressure inside the duct as measured by the pressure sensor when the fan operates in the normal state. When the reference pressure is defined as described above, and when the pressure measured by the pressure sensor is higher than the reference pressure, it may be determined that the second filter 533 is blocked. When the pressure measured by the pressure sensor is lower than the reference pressure, it may be determined that the first filter 513 is blocked. Therefore, the method for controlling the apparatus as shown in FIG. 4 may determine which of the first filter 513 and the second filter 533 is blocked with the contaminants, based on the pressure comparison operation S31.

The control method as shown in FIG. 4 may include, before the initiation of the cleaning operation S50, a notification operation S33 (first notification operation) of notifying the user that cleaning of the second filter assembly 53 is required on the display 119. The notification operation S33 may be embodied as a process of notifying the user that cleaning of the second filter assembly 53 or the heat-absorber 41 is required via at least one of a display panel disposed in the display 119 and a speaker.

In one example, the control method of FIG. 4 may include, before the initiation of the cleaning operation S50, a water-level determination operation S40 of determining whether the water-level of the water collector body 371 is higher than the predefined cleaning-related reference water-level. This operation S40 is performed because cleaning of the second filter assembly 53 is impossible when there is no water in the water collector body 371.

The water-level determination operation S40 is performed using the water-level sensor 92 which may be configured to measure the water-level inside the water collector body 371. The cleaning operation S50 is preferably initiated when the water-level inside the water collector body 371 is equal to or higher than the cleaning-related reference water-level.

In one example, when the water-level inside the water collector body 371 is lower than the cleaning-related reference water-level, the control method of FIG. 4 may perform a water supply request operation S45 of requesting of water supply to the water storage body 72 via at least one of the display panel and the speaker.

In the water supply request operation S45, the user may extend the water storage body 72 from the cabinet 1 and may supply water to the communication hole 721 or the inlet 722 defined in the water storage body 71.

After the water supply to the water storage body 72, the user may insert the water storage body 72 into the cabinet 1 to connect the water storage body 72 to the water supplier 8. When the water storage body 72 is inserted into the cabinet 1, the valve actuator 83 of the water supplier 8 may open the water discharge valve 82 disposed in the water storage body. Thus, the inside of the water storage body 72 may be connected to the water supply pipe 84.

When the water supply hole 131 of the water storage body as shown in FIG. 3 is defined in the top panel 13 of the cabinet, the user may also supply water to the water storage body 72 through the water storage body water supply hole 131.

The control method of FIG. 4 may proceed with a water supply operation S47 of controlling the water supply valve 85 to open the water supply pipe 84 during the water supply request operation S45 or after completion of the water supply request operation S45. When the user has supplied the water to the water storage body 72, the water inside the water storage body 72 may be transferred to the water collector body 371 via the water supply operation S47.

In one example, when the water collector body 371 may be constructed to receive the water directly from the water supply source located outside of the cabinet 1, the control method of FIG. 4 may proceed directly to the water supply operation S47 without proceeding with the water supply request operation S45. In this case, the water supply operation S47 may refer to a process of controlling the connection channel valve 87 to open the connection channel 86 connecting the external water supply source and the water collector body 371 to each other.

When it is determined that the pressure measured by the pressure sensor 94 in the pressure comparison operation S31 is lower than the reference pressure S31, the control method may perform a cleaning request operation S37 of outputting a message requesting cleaning of the first filter 513 on the display 119. This operation S37 is intended to persuade the user to clean the first filter assembly 51 to prevent an increase in a duration of a subsequent drying operation S60 to be performed.

The cleaning request operation S37 may be embodied as a process of outputting a message requesting cleaning of the first filter 513 via at least one of the display panel disposed in the display 119 and a speaker.

In one example, a state where the pressure measured by the pressure sensor 94 is lower than the reference pressure may be observed not only when the first filter 513 is blocked, but also when a large amount of laundry is input to the drum body 21. This is because when there is a lot of laundry in the drum body 21, an amount of air that flows into the discharge duct 31 per unit time may decrease.

To distinguish whether the state in which the pressure measured by the pressure sensor 94 is lower than the reference pressure is due to the amount of laundry or to the amount of contaminants remaining on the first filter 513, The control method of FIG. 4 may further include a humidity comparison operation S35 of comparing humidity of the air introduced into the duct 3 with a predefined reference humidity.

In order to perform the humidity comparison operation S35, the control method should be configured to further include a humidity measurement operation S23 of measuring the humidity of air introduced into the duct 3 using the humidity sensor 94. Since the humidity measurement operation S23 must be performed while the fan 49 is operating, the humidity measurement operation S23 is preferably performed simultaneously with the pressure measurement operation S21.

In this case, the cleaning request operation S37 may be preferably initiated when the pressure measured in the pressure measurement operation S21 is lower than the reference pressure, and when the humidity measured in the humidity measurement operation S35 is lower than a reference humidity. This is because when the humidity of the air introduced into the duct 3 is higher than the reference humidity, it may be determined that the amount of laundry input to the drum body is large.

The control method of FIG. 4 may perform a drying operation S60 when the cleaning operation S50 is completed, or when the humidity measured in the humidity measurement operation S35 is higher than the reference humidity.

The drying operation S60 may be configured to include an operation S61 of rotating the drum body 21 via the motor 23, an operation S63 of circulating air inside the drum body via operating of the fan 49, and an operation S65 of operating the heat exchanger 4.

The operation S63 of operating the fan may refer to a process in which the controller rotates the impeller 491 via the impeller motor 493. The operation S65 of operating the heat exchanger 4 may refer to a process in which the controller operates the compressor 45 and the pressure adjuster 47 to perform heat exchange between the air introduced into the duct and the refrigerant.

The drying operation S60 may be initiated even when a predefined reference time duration elapses after the termination of the cleaning request operation S37. There may be a situation where the user does not clean the first filter 513 despite the execution of the cleaning request operation S37. In this case, rather than waiting for the cleaning of the first filter 513, execution of the drying operation S60 may be more advantageous in terms of user convenience.

The control method of FIG. 4 may proceed with a dryness measurement operation S69 while the drying operation S60 is in progress. The dryness measurement operation S69 may be configured to be executed every time a predefined reference period has elapsed S67 from a time when the drying operation S60 is initiated and may be configured to be terminated upon termination of the drying operation S60.

The dryness measurement operation S69 may be carried out using the humidity sensor 96. Because the higher the dryness of laundry, the lower the humidity of the air flowing into the duct may be, the control method may be able to determine the dryness of laundry based on the humidity measured by the humidity sensor 96.

When the dryness measured in the dryness measurement operation S69 reaches a predefined target dryness S70, the control method of FIG. 4 may terminate the drying operation S60 S80. The termination operation S80 may include a process of terminating the rotation of the motor 2, a process of terminating the operation of the fan 49, a process of terminating the operation of the heat exchanger, and a process of terminating the dryness measurement operation. Alternatively, the termination operation S80 may be performed when a time duration for which the drying operation S60 has been performed reaches a predefined target time duration.

When the drying operation is terminated S80, the control method may proceed with a water discharge operation of transferring the water from the water collector 37 to the water discharger 7 through the water discharger supply pipe 633. The water discharge operation may refer to a process in which the controller controls the pump 61 and the channel switch 63 such that the water from the water collector body 371 moves to the water storage body 72 along the water discharger supply pipe 633.

The control method of FIG. 5 may differ from the control method of FIG. 4 in that the control method of FIG. 5 further includes an atmospheric pressure measurement operation S15 which is carried out before the pressure measurement operation S21, and the pressure comparison operation S31 in FIG. 5 compares a difference (measured pressure–atmospheric pressure) between the pressure measured in the pressure measurement operation S21 and a pressure measured in the atmospheric pressure measurement operation with a difference (reference pressure-atmospheric pressure) between the reference pressure and the pressure measured in the atmospheric pressure measurement operation.

The control method of FIG. 4 in which the pressure comparison operation S31 compares only the predefined reference pressure and the measured pressure measured in the pressure measurement operation with each other may determine that the same filter state varies depending on an atmospheric pressure of a region where the laundry treating apparatus 100 is installed.

The control method of FIG. 4 may be implemented in a region with high altitude and thus low atmospheric pressure. Alternatively, the control method of FIG. 4 may be executed in a region where atmospheric pressure is lowered due to weather. In this case, a pressure output from the pressure measurement operation S21 performed in a region with the low atmospheric pressure may be lower than a pressure output from the pressure measurement operation S21 performed in a region where atmospheric pressure is normal. Therefore, in an approach of determining which filter is clogged based on the comparing result between the pressure measured in the pressure measurement operation S21 and the predefined reference pressure, without consideration of the atmospheric pressure in the region where the laundry treating apparatus is installed, which filter requires cleaning thereof may not be correctly determined.

In the control method of FIG. 5, the pressure comparison operation S31 may compare the difference between the measured pressure and the atmospheric pressure with the difference between the reference pressure and the atmospheric pressure, thereby to determine which filter requires cleaning thereof regardless of the region where the laundry treating apparatus is located and the weather condition.

The atmospheric pressure measurement operation S15 may be initiated S10 when power supply to the laundry treating apparatus is requested via the input interface 118, or when the door 112 opens the laundry inlet 111. In the atmospheric pressure measurement operation S15, the fan 49 does not work.

The control method of FIG. 5 may include, after the atmospheric pressure measurement operation S15, the pressure measurement operation S21, the humidity measurement operation S23, the fan operation termination operation S25, and the pressure comparison operation S31. When the difference between the measured pressure and the atmospheric pressure in the pressure comparison operation S31 is greater than or equal to the difference between the reference pressure and the atmospheric pressure, the control method of FIG. 5 may proceed with the notification operation S33 and the water-level determination operation S40. Depending on the water-level of the water collector body 371 as determined in the water-level determination operation S40, the control method may proceed directly to the cleaning operation S50 or may execute the water supply request operation S45 and the water supply operation S47, and then the cleaning operation S50.

In one example, when it is determined in the pressure comparison operation S31 that the difference between the measured pressure and the atmospheric pressure is lower than the difference between the reference pressure and the atmospheric pressure, the control method of FIG. 5 may proceed directly to the cleaning operation S50 or may execute the cleaning request operation S37 and then the cleaning operation S50, depending on the result of the humidity comparison operation S35.

After completion of the cleaning operation S50, the control method of FIG. 5 may proceed with the drying operation S60. The drying operation is terminated when the dryness measured in the dryness measurement operation S69 reaches the target dryness S70 and S80.

A control method of FIG. 6 is characterized in that a case in which both the first filter 513 and the second filter 533 are blocked may be identified. The control method according to this embodiment may include the atmospheric pressure measurement operation S15, the pressure measurement operation S21, the humidity measurement operation S23, and the operation S25 to terminate the fan operation. The atmospheric pressure measurement operation S15 may be initiated S10 when power supply is requested via the input interface or when the door opens the laundry inlet.

The atmospheric pressure measurement operation S15, the pressure measurement operation S21, the humidity measurement operation S23, and the operation S25 to terminate the fan operation may be the same as described with reference to the control methods of FIGS. 4 and 5.

When the fan operation is terminated, the control method of FIG. 6 may proceed with an operation S30 to determine whether the pressure measured in the pressure measurement operation S21 is equal to the atmospheric pressure measured in the atmospheric pressure measurement operation S15.

When the pressure measured in the pressure measurement operation S21 is different from the pressure measured in the atmospheric pressure measurement operation S15, the method to control FIG. 6 may proceed with the comparison operation S31 of comparing the difference between the measured pressure measured in the pressure measurement operation S21 and the pressure measured in the atmospheric pressure measurement operation S15 with the difference between the reference pressure and the pressure measured in the atmospheric pressure measurement operation S15.

When the difference between the measured pressure and the atmospheric pressure is greater than or equal to the difference between the reference pressure and the atmospheric pressure, the control method according to this embodiment may proceed with the notification operation S33 (first notification operation), and the water-level determination operation S40. Depending on the water-level of the water collector body 371 measured in the water-level determination operation S40, the control method may proceed directly to the cleaning operation S50, or may execute the water supply request operation S45 and the water supply operation S47, and then the cleaning operation S50.

When the difference between the measured pressure and the atmospheric pressure is smaller than the difference between the reference pressure and the atmospheric pressure, the control method of FIG. 6 may proceed with cleaning operation S50, or proceed with the cleaning request operation S37 and then the cleaning operation S50, based on the result of the humidity comparison operation S35

In one example, when the pressure measured in the pressure measurement operation S21 is equal to the pressure measured in the atmospheric pressure measurement operation S15 S30, the control method of FIG. 6 may perform a notification operation S32 (second notification operation) of notifying the user that both the first filter 513 and the second filter 533 are blocked, on the display 119.

The control method of FIG. 6 may include, after completion of the second notification operation S32, an operation S34 of requesting the user to clean the first filter 513 on the display 119, and an operation S40 of measuring the water-level of the water collector body 371. Based on the water-level of the water collector body 371 measured in the water-level determination operation S40, the control method may proceed directly to the cleaning operation S50, or execute the water supply request operation S45 and the water supply operation S47, and then the cleaning operation S50.

After completion of the cleaning operation S50, the control method of FIG. 6 may proceed with the drying operation S60. The drying operation may be terminated when the dryness measured in the dryness measurement operation S69 reaches the target dryness S70 and S80.

The pressure comparison operation S31 of the control method of FIG. 6 may be embodied as an operation of determining whether the pressure measured in the pressure measurement operation S21 is greater than the reference pressure.

The laundry treating apparatus and the control method as above-described according to the present disclosure may determine which of the first filter and the second filter requires cleaning thereof, and may take appropriate action accordingly.

The laundry treating apparatus and the method for controlling the laundry treating apparatus as above-described may be modified and implemented in various forms, and the scope of the disclosure is not limited to the above-described embodiments.

The invention claimed is:

1. A method for controlling a laundry treating apparatus, wherein the laundry treating apparatus comprises: a drum having a laundry storage space defined therein; a duct defining a channel for supplying air discharged from the drum back to the drum; a fan to move air along the duct; a heat-absorber for removing moisture from air introduced into the duct; a heat-emitter disposed inside the duct to heat air passing through the heat-absorber; a water collector for storing therein water discharged from air passing through the heat-absorber; a first filter for filtering air flowing from the drum to the duct; a second filter positioned between the first filter and the heat-absorber and filtering air passing through the first filter; a water discharger having a water storage space defined therein; a water discharger supply pipe for supplying water stored in the water collector to the water discharger; a water ejector for ejecting water into at least one of the second filter or the heat-absorber; a water ejector supply pipe for supplying water stored in the water collector to the water ejector; a water supply pipe configured to connect the water discharger and the water collector to each other; a water supply valve for controlling opening and closing of the water supply pipe, the method comprising:

a fan operation in which the fan causes air to move along the duct;

a pressure measurement operation in which a pressure sensor located between the first filter and the second filter measures a pressure inside the duct during the fan is operation;

a cleaning request operation in which when the pressure measured by the pressure sensor is lower than a predefined reference pressure, a message requesting cleaning of the first filter is output via at least one of a display panel or a speaker; and a cleaning operation in which when the pressure measured by the pressure sensor is greater than or equal to the reference pressure, the water ejector ejects the water to at least one of the second filter or the heat-absorber.

2. The method of claim 1, further comprising a water-level measurement operation in which a water-level sensor measures a water-level of the water collector.

3. The method of claim 2, further comprising a water supply request operation in which when the water-level of the water collector is lower than a cleaning-related reference water-level, water supply to the water discharger is requested via at least one of the display panel or the speaker.

4. The method of claim 3, further comprising a water supply operation in which during the water supply request operation or after completion of the water supply request operation, the water supply valve controls the water supply pipe to connect the water discharger and the water collector to each other such that water inside the water discharger flows to the water collector.

5. The method of claim 4, further comprising a humidity measurement operation in which a humidity sensor located between the first filter and the second filter measures a humidity of air introduced into the duct during the fan operation, wherein the cleaning request operation is initiated when the pressure measured by the pressure sensor is lower than the reference pressure, and the humidity measured by the humidity sensor is lower than a predefined reference humidity.

6. The method of claim 5, further comprising a drying operation in which when the pressure measured by the pressure sensor is lower than the reference pressure, and the humidity measured by the humidity sensor is greater than or equal to the reference humidity, the fan, the heat-absorber, and the heat-emitter perform heat exchange between air and laundry in the drum.

7. The method of claim 5, further comprising:

an atmospheric pressure measurement operation in which the pressure sensor measures a pressure inside the duct when an operation of the fan stops; and a notification operation in which when the pressure measured in the pressure measurement operation is equal to the pressure measured in the atmospheric pressure measurement operation, a message that the first filter and the second filter are blocked is notified to a user via at least one of the display panel or the speaker.

8. The method of claim 4, further comprising an atmospheric pressure measurement operation in which the pressure sensor measures a pressure inside the duct when an operation of the fan stops, wherein the cleaning operation is initiated when the pressure measured in the pressure measurement operation is different from the pressure measured in the atmospheric pressure measurement operation, and a difference between the pressure measured in the pressure measurement operation and the pressure measured in the atmospheric pressure measurement operation is equal to or greater than a difference between the reference pressure and the pressure measured in the atmospheric pressure measurement operation.

9. The method of claim 8, further comprising a humidity measurement operation in which a humidity sensor located between the first filter and the second filter measures a humidity of air introduced into the duct while the fan is working, wherein the cleaning request operation is initiated when the pressure measured in the pressure measurement operation is different from the pressure measured in the atmospheric pressure measurement operation, a difference between the pressure measured in the pressure measurement operation and the pressure measured in the atmospheric pressure measurement operation is smaller than a difference between the reference pressure and the pressure measured in the atmospheric pressure measurement operation, and the humidity measured by the humidity sensor is lower than a predefined reference humidity.

10. The method of claim 9, further comprising further comprises a drying operation in which when the pressure measured in the pressure measurement operation is different from the pressure measured in the atmospheric pressure measurement operation, a difference between the pressure measured in the pressure measurement operation and the pressure measured in the atmospheric pressure measurement operation is smaller than a difference between the reference pressure and the pressure measured in the atmospheric pressure measurement operation, and the humidity measured by the humidity sensor is greater than or equal to the reference humidity, the fan, the heat-absorber, and the heat-emitter work to perform heat exchange between air and laundry in the drum.

11. The method of claim 2, further comprising a water supply operation in which when the water-level of the water collector is lower than a cleaning-related reference water-level, a connection channel valve controls opening and closing of a connection channel connecting a water supply source located outside the laundry treating apparatus and the water collector to each other such that water is supplied to the water collector through the connection channel.

* * * * *